(12) United States Patent
Cutts

(10) Patent No.: US 8,990,935 B1
(45) Date of Patent: Mar. 24, 2015

(54) ACTIVITY SIGNATURES AND ACTIVITY REPLAY DETECTION

(71) Applicant: Google Inc., Mountain View, CA (US)

(72) Inventor: Matthew D. Cutts, Los Altos, CA (US)

(73) Assignee: Google Inc., Mountain View, CA (US)

(*) Notice: Subject to any disclaimer, the term of this patent is extended or adjusted under 35 U.S.C. 154(b) by 49 days.

(21) Appl. No.: 13/653,480

(22) Filed: Oct. 17, 2012

(51) Int. Cl.
*H04L 9/00* (2006.01)

(52) U.S. Cl.
USPC .......................................................... 726/22

(58) Field of Classification Search
CPC .. H04L 63/14; H04L 63/1408; H04L 63/1416
USPC .................................................... 726/22, 23
See application file for complete search history.

(56) References Cited

U.S. PATENT DOCUMENTS

| | | | |
|---|---|---|---|
| 7,500,264 B1* | 3/2009 | Leavy et al. | 726/13 |
| 7,590,855 B2* | 9/2009 | Irwin | 713/181 |
| 8,352,589 B2* | 1/2013 | Ridel et al. | 709/224 |
| 2003/0115333 A1 | 6/2003 | Cohen | |
| 2003/0130982 A1 | 7/2003 | Kasriel | |
| 2006/0150249 A1* | 7/2006 | Gassen et al. | 726/23 |
| 2008/0263633 A1 | 10/2008 | Banga | |
| 2009/0013181 A1* | 1/2009 | Choi et al. | 713/168 |
| 2009/0070129 A1 | 3/2009 | Inbar | |
| 2009/0077663 A1* | 3/2009 | Sun et al. | 726/23 |
| 2010/0049847 A1 | 2/2010 | Muret | |
| 2010/0235241 A1 | 9/2010 | Wang | |
| 2011/0246267 A1 | 10/2011 | Williams | |
| 2012/0159564 A1* | 6/2012 | Spektor et al. | 726/1 |
| 2012/0331553 A1* | 12/2012 | Aziz et al. | 726/23 |
| 2013/0227691 A1* | 8/2013 | Aziz et al. | 726/24 |

OTHER PUBLICATIONS

Lane, T. and Brodley, C.E., "An Application of Machine Learning to Anomaly Detection" School of Electrical and Computer Engineering, Purdue University, West Lafayette, IN, Feb. 14, 1997 (Abstract), 13 pages.

(Continued)

*Primary Examiner* — Matthew Smithers
(74) *Attorney, Agent, or Firm* — Fish & Richardson P.C.

(57) ABSTRACT

Methods, systems, and apparatus, including computer programs encoded on a computer storage medium, for generating activity signatures and detecting activity replays. In one aspect, a method includes accessing activity data first and second activity sequences; generating a first activity sequence signature from the first activity sequence, and generating, for each second activity sequence, a respective second activity sequence signature from the second activity sequence; for each second activity sequence, determining a similarity measure that is a measure of similarity of the first activity sequence to the second activity sequence from the signatures; for each second activity sequence having a similarity measure that meets a threshold, determining that a security violation occurred during the second user session of the second activity sequence; and for each second activity sequence having a similarity measure that does not meet the threshold, determining that a security violation did not occur during the second user session.

35 Claims, 3 Drawing Sheets

(56) References Cited

OTHER PUBLICATIONS

Sadowski C. and Levin G., "SimHash: Hash-based Similarity Detection" Dec. 13, 2007, [online]. Retrieved on Apr. 27, 2012. Retrieved from Internet electronic mail: http://simhash.googlecode.com/svn/trunk/paper/SimHashWithBib.pdf, 10 pages.

Youncheng et al., "Survey of Anonymity Techniques for Privacy Preserving," International Symposium on Computing, Communication, and Control 2009, Proc. of CSIT vol. 1, 2011, 5 pages.

Byun et al., "Efficient k-Anonymization Using Clustering Techniques," CERIAS and Computer Science, Purdue University, DASFAA 2007, LNCS 4443, pp. 188-200, 2007, 13 pages.

\* cited by examiner

ACTIVITY SIGNATURES AND ACTIVITY REPLAY DETECTION

BACKGROUND

This specification relates to computer systems and network security.

The Internet provides access to a wide variety of resources. For example, video files, audio files, and image files, as well as web pages for particular subjects or articles, are accessible over the Internet. Patterns of access to these resources present opportunities for Internet services to take into account activity signals when providing content and when evaluating objective and subjective audience preferences. For example, an advertising service may evaluate performance data for an advertising campaign for a particular advertiser to determine the effectiveness of the campaign. Furthermore, a social network service may evaluate both positive and negative endorsements of the advertiser received from users and other entities to determine an overall popularity metric for the advertiser. These are just two of many examples of how Internet services can use activity signals in the contexts of content evaluation and provisioning of content to users.

Certain entities, however, may implement deceptive practices in an effort to distort or "game" the activity signals to their advantage. For example, a spammer, by means of multiple computer programs (e.g., "bots," which are software programs that run automated tasks over the Internet), may create fake user accounts, each of which is controlled by a respective computer program. Each respective computer program is designed to perform actions that are to the benefit of the spammer. For example, each bot may issue multiple positive endorsements of the spammer, or may issue multiple negative endorsements of the spammer's competitors. Each of these activities constitutes a form of security violation.

There are many detection schemes that are used to detect bot activity. For example, N/M detection schemes, where N is the number of activities and M is a time period, are effective for identifying noisy, burst-like bot behavior, or excessive amounts of a particular behavior. Likewise, pattern recognition detection schemes are effective for identifying algorithmically generated sequences of activities. However, as the detection schemes become more sophisticated, so to do the surreptitious activities of the agents.

SUMMARY

This specification describes technologies relating to generating activity signatures and using the activity signatures to detect replay activities.

In general, one innovative aspect of the subject matter described in this specification can be embodied in methods that include the actions of accessing activity data describing a first activity sequence for a first user session, the first activity sequence being a first sequence of activities that were observed during the first user session, each activity in the first activity sequence being at a respective ordinal position in the sequence, and a plurality of second activity sequences, wherein each second activity sequence is for a respective second user session that is a different session from the first user session and being a second sequence of activities that were observed during the second user session, each activity in the second activity sequence being at a respective ordinal position in the sequence; generating a first activity sequence signature from the first activity sequence; generating, for each second activity sequence, a respective second activity sequence signature from the second activity sequence; for each second activity sequence, determining from the first activity sequence signature and the second activity sequence signature of the second activity sequence, a similarity measure that is a measure of similarity of the first activity sequence to the second activity sequence; for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence. Other embodiments of this aspect include corresponding systems, apparatus, and computer programs, configured to perform the actions of the methods, encoded on computer storage devices.

Another innovative aspect of the subject matter described in this specification can be embodied in methods that include the actions of accessing activity data describing a first activity sequence for a first user session, the first activity sequence being a first sequence of activities that were observed during the first user session, each activity in the first activity sequence being at a respective time relative to other activities in the first activity sequence, and a plurality of second activity sequences, wherein each second activity sequence is for a respective second user session that is a different session from the first user session and being a second sequence of activities that were observed during the second user session, each activity in the second activity sequence being at a respective time in the second activity sequence relative to other activities in the second activity sequence; generating a first activity sequence signature from the first activity sequence; generating, for each second activity sequence, a respective second activity sequence signature from the second activity sequence; for each second activity sequence, determining, from the first activity sequence signature and the second activity sequence signature of the second activity sequence, a similarity measure that is a measure of similarity of the first activity sequence to the second activity sequence; for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The effectiveness of replay attacks is significantly reduced by the replay detection, which, in turn, reduces the utility of surreptitiously monitored user activities. Furthermore, some implementations monitor only activities within a predefined window of an objective activity of the attacker (e.g., activities that come before and after objective activities such as an endorsement, a selection of an advertisement, or a selection of a query suggestion), thereby reducing resource requirements. Subsampling or hashing overall activity can reduce resource and storage requirements. This also facilitates processing historical data for longer periods measure from before and after subject events.

The details of one or more embodiments of the subject matter described in this specification are set forth in the accompanying drawings and the description below. Other

BRIEF DESCRIPTION OF THE DRAWINGS

Like reference numbers and designations in the various drawings indicate like elements.

DETAILED DESCRIPTION

Overview

Figure 1:
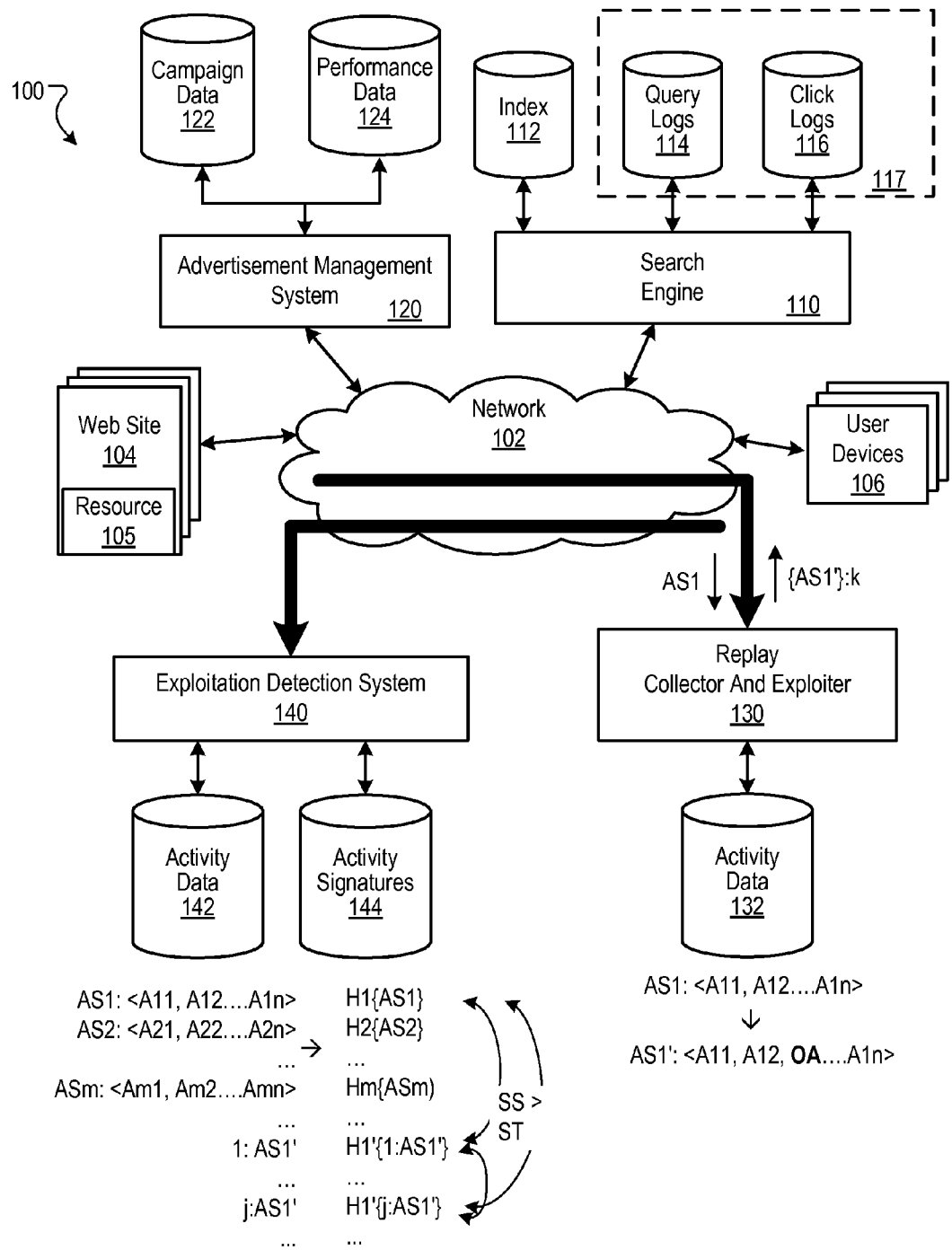
FIG. 1 is a block diagram of example environment in which an exploitation detection system monitors for activity replays.

As internet services rely more on social signals, spammers have an incentive to create fake profiles with fake activities. The fake activities can be derived from activities of users that are observed during user sessions. The fake activities include the actual activities of the users and, optionally, one or more activities injected into the actual activity streams. By starting with a stream of recorded actual activities of a human user, and the optionally injected activity, a spamming agent (e.g., a bot) can better avoid detection.

The fake activities are objective activities of the spammer. Example objective activities are clicking on advertisements; selecting search suggestions for a particular query; endorsing content (e.g., selecting a "+1" button for the content); and other such activities that are indicative a positive (or negative) human experiences with particular content.

The subject matter of this application is directed to detecting such spamming actions. A system processes activity sequences for each session in a set of user sessions, and compares the sequences. Very similar sequences are a signal of a replay security violation e.g., a bot agent is replaying actual activities previously performed by a user.

The system is described in the context of comparing a first activity sequence to multiple other second activity sequences. The first activity sequence is for a first user session, and is a sequence of activities that were observed during the first user session. Each activity in the first activity sequence is at a respective ordinal position in the sequence. For example, if the activity sequence is the inputting a query of n characters, a selection of the query, and then a selection of the search result, the activity sequence may be the following n+2 actions at respective ordinal positions of 1 . . . n+2: the inputting of each of the n characters, a selection of the query, and then a selection of a search result.

Similarly, each second activity sequence is for a respective second user session that is a different session from the first user session. Each second sequence is of activities that were observed during the second user session, and each activity in the second activity sequence is at a respective ordinal position in the sequence.

For each of the first activity sequences, a first activity sequence signature is generated, and likewise for each second activity sequence, a respective second activity sequence signature is generated. Then, for each second activity sequence, a similarity measure that is a measure of similarity of the first activity sequence to a second activity sequence is determined from the respective signatures. For each second activity sequence having a similarity measure that meets a threshold, a security violation is determined to have occurred during the second user session. Conversely, for each second activity sequence having a similarity measure that does not meet the threshold, a security violation is determined to not have occurred during the second user session.

These features and other features are described in more detail in the sections that follow.

Example Operating Environment

FIG. 1 is a block diagram of an example environment 100 in which an exploitation detection system 140 monitors for activity stream replays. A computer network 102, such as a local area network (LAN), wide area network (WAN), the Internet, or a combination thereof, connects publisher web sites 104, user devices 106, and the search engine 110, and an advertisement management system 120. The online environment 100 may include many thousands of publisher web sites 104 and user devices 106.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a content publisher, which is an entity that controls, manages and/or owns the website 104.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as scripts).

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102. The web browser can enable a user to display and interact with text, images, videos, music and other information typically located on a web page at a website on the World Wide Web or a local area network.

To facilitate searching of these resources 105, the search engine 110 identifies the resources by crawling the publisher web sites 104 and indexing the resources provided by the publisher web sites 104. The indexed and, optionally, cached copies of the resources, are stored in an index 112.

The user devices 106 submit search queries to the search engine 110. The search queries are submitted in the form of a search request that includes the search request and, optionally, a unique identifier that identifies the user device 106 that submits the request. The unique identifier can be data from a cookie stored at the user device, or a user account identifier if the user maintains an account with the search engine 110, or some other identifier that identifies the user device 106 or the user using the user device.

In response to the search request, the search engine 110 uses the index 112 to identify resources that are relevant to the queries. The search engine 110 identifies the resources in the form of search results and returns the search results to the user devices 106 in search results page resource. A search result is data generated by the search engine 110 that identifies a resource that satisfies a particular search query, and includes a resource locator for the resource. An example search result can include a web page title, a snippet of text extracted from the web page, and the URL of the web page. The search results are ordered according to search scores determined for the underlying resources and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the web site 104 hosting the resource receives the request for the resource from the user device 106 and provides the resource to the requesting user device 106.

In some implementations, the queries submitted from user devices 106 are stored in query logs 114. Click data for the queries and the web pages referenced by the search results are stored in click logs 116. The query logs 114 and the click logs 116 define search history data 117 that include data from and related to previous search requests associated with unique identifiers. The click logs define actions taken responsive to search results provided by the search engine 110. The query logs 114 and click logs 116 can be used to map queries submitted by the user devices to web pages that were identified in search results and the actions taken by users (i.e., that data are associated with the identifiers from the search requests so that a search history for each identifier can be accessed). The click logs 116 and query logs 114 can thus be used by the search engine to determine the sequence of queries submitted by the user devices, the actions taken in response to the queries, and how often the queries are submitted.

The advertisement management system 120 facilitates the provisioning of advertisements with the resources 105. In particular, the advertisement management system 120 allows advertisers to define selection rules that take into account attributes of the particular user to provide relevant advertisements for the users. When a user of a user device 106 selects an advertisement, the user device 106 generates a request for a landing page of the advertisement, which is typically a webpage of the advertiser. For example, the publishers 104 may include advertisers, each having hosting respective web pages, some of which are landing pages for the advertisements of the advertisers. These advertisements can be provided for many different resources, such as the resources 105 of the publishers 104, and on a search results page resource.

The advertisement management system 120 includes a data storage system that stores campaign data 122 and performance data 124. The campaign data 122 stores advertisements, selection rules, and budgeting information for advertisers. The performance data 124 stores data indicating the performance of the advertisements that are served. Such performance data can include, for example, click through rates for advertisements, the number of impressions for advertisements, and the number of conversions for advertisements. Other performance data can also be stored.

The search engine 110 and the advertisement management system 120 are two example Internet services that provide content to users and help users satisfy their informational needs. Other such services that provide content to users and help users satisfy their informational needs may include social networking services, mail and messaging services, news aggregators, retail services, and the like. Each of these services typically store historical data describing user activities resulting from activities of users taken by use of their respective user devices 106.

Activity Collection and Replay Exploits

The activities of users determine in varying extent the popularity of certain content provided over the network, revenue distribution among advertisers, web sites and the advertisement management system, and search rankings of content by the search engine. Accordingly, certain activities, in the aggregate, can be of great commercial value to certain parties. Examples of such objective activities include the submission of particular search queries, the selection of particular search results, the selection of particular advertisements, positively (or negatively) endorsing certain content, the publishing of certain links, to name just a few. Unfortunately some of these parties attempt to exert undue influence by surreptitious techniques, such as by employing spamming agents or bots to perform these objective activities.

Many Internet services, however, employ detection systems to detection the presence of bot activity, and to block the sources of bot activity once detected. These detection systems, however, generally allow the activities of human users. Thus, to circumvent these detection systems, an entity, such as a spammer, may observe user activities and record the activities. The entity may then deploy a bot agent that is programmed to perform the recorded activities that are observed from humans that actually performed the recorded activities. Optionally, the computer program can be further configured to inject one or more objective activities into the replayed activities to obfuscate the replay of the recorded activities.

Such a system and process is illustrated in the replay collector and exploiter 130 of FIG. 1. The replay collector and exploiter 130 collects activities that are observed during user sessions, as indicted by AS1. In addition to the activities described above, the activities may also include touch patterns and sequences on touch-enabled devices. As used herein, a "user session" constitutes a set of activities for a particular user device. Any appropriate criteria may be used to define a user session. For example, the user session may be defined by one or more of time, number of activities, and sites. For example, a user session may be all activities that occur within a N-second time period, where N=10, 100, or 1,000 seconds. Alternatively or in addition, a user session may include up to a maximum number of M observed activities, where M=10, 50, or 200 activities. Likewise, a user session may include only activities observed for a specific web site or application. For example, assume a user device 106 navigates to a social network site and performs 30 activities; then the user device navigates to a search engine site and performs 12 activities; then navigates to a catalog site and performs 15 activities; and then navigates back to the social network site and performs 12 more activities. If the user sessions are partitioned, in part, by sites, then three sessions are observed—a session of 42 activities for the social network site, a session of 12 activities for the search engine site, and a session 15 activities for the catalog site.

Each activity sequence is a sequence of activities that were observed during the user session, and each activity in activity sequence is at a respective ordinal position in the sequence. For example, as illustrated in FIG. 1, the sequence AS1 has n activities in sequence, i.e., <A11, A12 . . . A1n>. In some implementations, the ordinal positions can also be based on a time value that describes a time that the activity occurred. The time values may be absolute times, such as epoch times, or relative time, such as a relative time of each activity relative to the first activity in the sequence.

The replay collector and exploiter 130 can collect the activities in a variety of ways. For example, the activities can be collected by use of surreptitious agents on user devices, routers and servers, by unauthorized access to data logs, and by other means. Alternatively, the collection may not be surreptitious, e.g., the entity runs an ISP, or install an application with the user's permission. The replay collector and exploiter 130 stores the activity sequence in an activity data store 132, and accesses the activity sequence to instruct agents' behavior during replay exploits.

The replay exploit may involve inserting an objective activity into the activity sequence. For example, as shown in FIG. 1, the objective activity OA is inserted into the activity sequence AS1, which, in turn, generates the modified activity sequence AS1'. To illustrate, assume the entity controlling the replay collector and exploiter 130 wants to issue positive endorsements for a particular web site. The replay collector and exploiter 130 will then monitor for activity sequences in which users performed activities on resources that included, for example, a "+1" endorsement button for the website on the resource. The replay collector and exploiter 130 will then insert its objective activity of selecting the "+1" button into the activity sequence. Bot agents are then used to control user devices 106 to perform the sequence of actions AS1'.

As illustrated in FIG. 1, the replay collector and exploiter 130 issues k replay attacks by infecting k user devices 106 and causing the k user devices to perform the sequence of actions AS1'.

An objective activity OA need not be inserted into an activity sequence if the activity sequence, as observed, already includes the objective activity. For example, the replay collector and exploiter 130 may replay activity sequences performed by actual users that selected the "+1" button for the web site.

Because the agents of the replay collector and exploiter 130 perform activities in a manner very similar to, or exactly the same as, actual human users, some detection systems are not able to detect the exploits.

Replay Exploitation Detection

An exploitation detection system 140 is used to detect replays by agents of the replay collector and exploiter 130. Although shown as an entity separate from the web sites 104, search engine 110, and the advertisement management system 120, the replay collector and exploiter 130 can also be implemented in each of these entities to protect each respective entity from replay exploits.

The exploitation detection system 140 also collect activity sequences and stores them in an activity data store 142. The exploitation detection system 140 collects the sequences in a variety of authorized ways, such as by use of authorized access to web sites and routers, authorized access to data logs, paying humans to perform activities, and by other authorized means. The activity sequences can, in some implementations, be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined.

As illustrated in FIG. 1, the activity data store 142 stores m actual activity sequences, each performed by users for different user sessions. The sequence AS1, which was also observed by the replay collector and exploiter 130, is also observed and stored by the exploitation detection system 140. Finally, the replays of AS1' are also observed and stored by the exploitation detection system 140.

Activity sequences of approximately the same length and approximately the same data in the same order are considered to be similar. In some implementations, to detect such similarity, the exploitation detection system 140 generates, for each activity sequence, a signature from the activity sequence, and stores the signatures in an activity signatures store 144. In some implementations, each signature is a hash value generated by a similarity hash algorithm. A similarity hash algorithm generates similar hash values for similar data sets. For example, if the hash value is a sequence of bits, the bitwise Hamming distance between hash values for two very similar data sets will be small, while the bitwise Hamming distance between hash values for two very different data sets will be large. A variety of similarity hash algorithms, including locality sensitive hash algorithms, may be used.

The signatures are generated based on each activity in the sequence and at each ordinal position of the activity. In some implementations, the time value of each activity can also be used to generate the signature.

In some implementations, the exploitation detection system 140 determines a similarity measure, such as a similarity score SS, that is a measure of two activity sequences. If, for example, the hash value is a sequence of bits, then the similarity score may be inversely proportional to the bitwise Hamming distance of the two values.

For each new activity sequence observed, the exploitation detection system 140 can determine an activity signature for the new sequence and compare the activity signature to the activity signatures of one (or more) of the previously received activity sequences. If the similarity score meets a similarity score threshold ST, then it is likely that one (or both) of the sequences corresponding to the compared activity sequence signatures may be a replay. Accordingly, the exploitation detection system 140 determines that a security violation occurred during the user session of at least one of the activity sequence. Otherwise, the exploitation detection system 140 determines that a security violation did not occur during the second user session of the second activity sequence.

As illustrated in FIG. 1, the activity sequences include the first activity sequence AS1 and at least two of the replays, a first replay AS1' and the $j^{th}$ replay AS1'. Based on the comparison of the activity signatures, at least the activity sequences for the replays of AS1' are determined to be associated with security violations.

Even in the absence of the actual activity sequence AS1, the exploitation detection system 140 would still determine that at least the $j^{th}$ replay of AS1' is a replay of the first instance of the replay AS1'. Thus, the observation of two or more instances of a replay can also be used to detect a replay exploitation.

The similarity and the types of activity sequences are further described with reference to FIGS. 2A-2C, which depict representations of activity sequences and replays of the activity sequences.

Figure 2A:
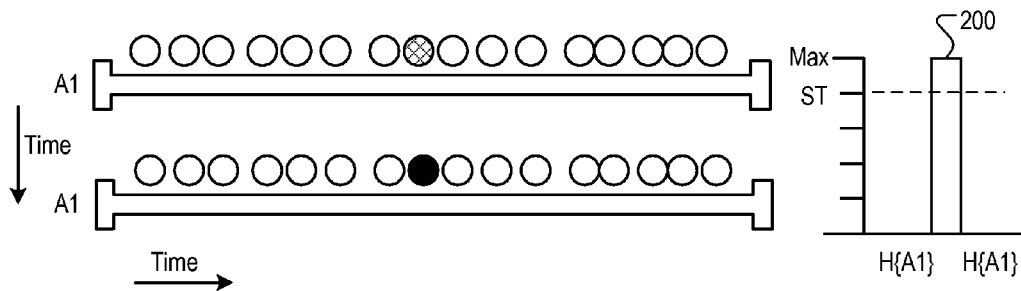
FIGS. 2A-2C depict representations of activity sequences and replays of the activity sequences.

In FIG. 2A, an activity sequence A1 is observed by both the replay collector and exploiter 130 and the exploitation detection system 140. The activity sequence includes a sequence of activities, each represented by a circle, and each at a respective ordinal position.

One of the activities in the activity sequence A1 is an objective activity of an entity, e.g., a positive or negative endorsement, a selection of an advertisement, etc. The objective activity in the original sequence is represented by the cross-hatched circle. For example, a user may have selected "+1" button to endorse a particular content item in a social network.

Because the activity sequence already includes the objective activity, the replay collector and exploiter 130 need not inject the objective activity into the sequence. Instead, an agent need only perform the same actions as the actual user, and in the same sequence and optionally at the same times, to obtain the benefit of the objective activity. Thus, at a later time, the replay collector and exploiter 130 replays the activity sequence A1, and performs the objective activity in replay, as indicated by the dark circle.

The exploitation detection system 140 generates an activity signature H {A1} in both instances. Because the signatures for both activity sequences are the same, the similarity score 200 exceeds the similarity score threshold ST. Accordingly, the exploitation detection system 140 determines a security violation has likely occurred.

Figure 2B:
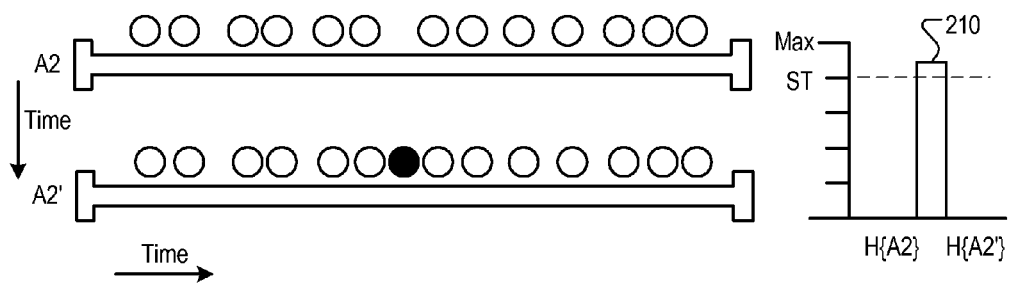
Figure 2C:
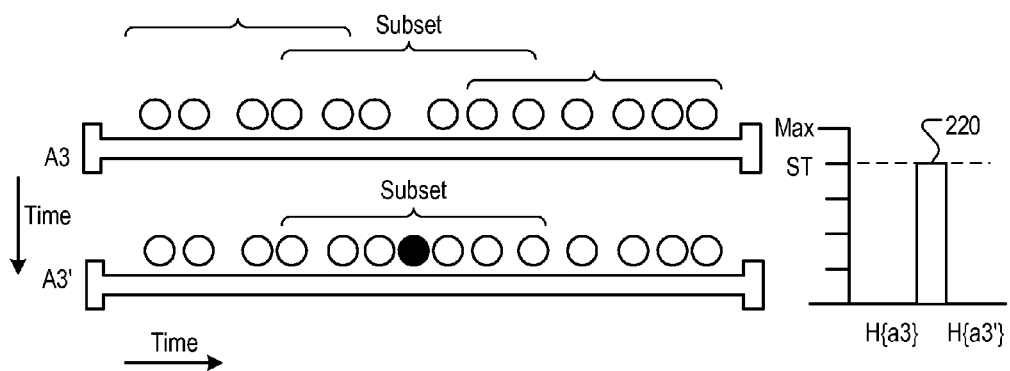

In FIG. 2B, a similar scenario occurs. However, in the activity sequence A2, when actually observed for a session, did not include the objective activity. For example, another user may have visited the same page that the user that performed the activity sequence A1 visited. However, the other user did not select the endorsement command. Thus, the replay collector and exploiter 130 injects the objective activity into the sequence to form a modified sequence A2' that includes the objective activity. At a later time, the replay collector and exploiter 130 replays the activity sequence A2', and performs the objective activity in replay.

The exploitation detection system 140 generates activity signatures H{A2} and H{A2'} for each instance. Because the activity sequences are very similar, the similarity score 210 exceeds the similarity score threshold ST. Accordingly, the exploitation detection system 140 determines a security violation has likely occurred.

In both FIGS. 2A and 2B, the exploitation detection system 140 generates an activity signature from all of the activities in an activity sequence. However, in some implementations, proper subsets of the activity sequences can be selected for analysis. Each proper subset constitutes an activity sequence subsequence, and a signature is generated for each subsequence. For example, as shown in FIG. 2C, subsequences are generated for each activity sequence.

The subsequences can be selected by a variety of appropriate techniques. For example, each subsequence can correspond to a period of time relative to the first activity in the sequence; or can be a subsample of every $n^{th}$ activity in the sequence; etc. Furthermore, each subsequence can overlap with another subsequence. Alternatively, each subsequence can constitute an exclusive subset of activities.

The number of activities in the subsequence can also be selected to ensure that any two subsequences have a cardinality that ensures that the signatures of two subsequences will at least meet the similarity threshold ST when one of the sequences is changed by one activity (such as the injection or substitution of the objective activity). The actual signature algorithm used, and the desired aggressiveness of detections, will determine the window size. As shown in FIG. 2C, the two subsequences differ by only the objective activity in the replay. Accordingly, the similarity score 220 determined from the two signatures H {a3} and H{a3'} for the subsets a3 and a3' meets the similarity score threshold ST.

If a security violation is determined to have occurred, the exploitation detection system 140 can discount the activity described by the objective activity. Discounting an activity mitigates the resultant effect of the activity, and may involve ignoring the result of the activity, decreasing the effect of the activity, or even inverting the effect of the activity. For example, if the exploitation detection system 140 is implemented in (or in data communication with) the search engine 110, selections of search results that appear to have been the result of a replay may not be counted in the click logs 116. Likewise, if the exploitation detection system 140 is implemented in (or in data communication with) the advertisement management system 120, selections of advertisements that appear to have been the result of a replay may not be stored in the performance data, and advertisers will not be charged for such selections. Additional steps can also be taken, such as isolating traffic originating from an IP address from which the suspected replay is originating, inverting the activity (e.g., for a binary operation, inverting the result of the binary operation, such as changing a positive endorsement to a negative endorsement; for a Likert scale ranking, transposing the ranking, such as changing a "4" to a "2" on a scale of 1-5; reducing a ranking score), reducing a score resulting from the operation, and so on.

Example Process Flow

Figure 3:
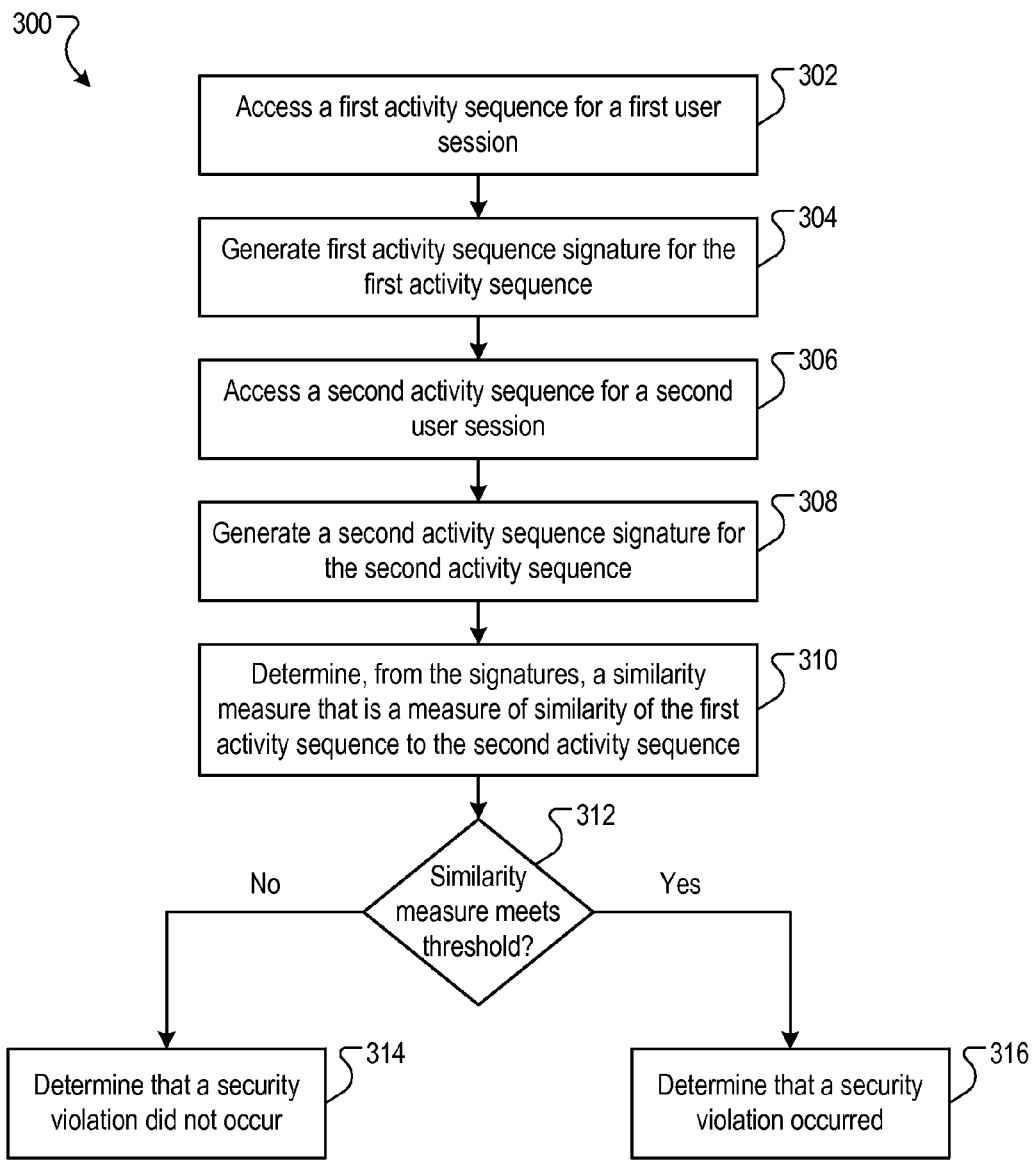
FIG. 3 is a flow diagram of an example process for determining activity signatures and detecting activity replays.

FIG. 3 is a flow diagram of an example process 300 for determining activity signatures and detecting activity replays. The process 300 is implemented in the exploitation detection system 140.

The process 300 accesses a first activity sequence for a first user session (302), and generates a first activity sequence signature for the first activity sequence (304). For example, the exploitation detection system 140 may monitor web traffic in real time and generate the sequence signatures, or may alternatively access traffic logs and process the logs as part of an off-line security enforcement process.

The process 300 accesses a second activity sequence for a second user session (306), and generates a second activity sequence signature for the second activity sequence (308).

For example, in the same manner as described with steps 302 and 304 above, the exploitation detection system 140 may monitor web traffic in real time and generate the sequence signatures, or may alternatively access traffic logs and process the logs as part of an off-line security enforcement process.

The process 300 determines, from the signatures, a similarity measure that is a measure of similarity of the first activity sequence to the second activity sequence (310). For example, depending on the signature values that are generated by the particular hash algorithm, a similarity measure based on a Hamming distance, Jaccard similarity coefficient, or a cosine similarity value can be generated.

The process 300 determines if the similarity measure meets a threshold (312). The value of the threshold may depend on how aggressive the detection process is designed to be. For example, a very low similarity threshold may be used if the tolerance to false positive detections is high. Conversely, a very high similarity threshold can be used if the tolerance to false positives is low. In the case of the latter, more replays may escape detection than in the case of the former.

If the similarity measure does not meet the threshold, the process 300 determines that a security violation did not occur (314). Conversely, if the similarity measure does meet the threshold, then the process determines that a security violation occurred (316).

Additional Implementation Details

In some implementations, the exploitation detection system 140 may store a list of predefined objective activities, and may only process activity sequences that include the objective activities. Narrowing the analysis to activity sequences that only include objective activities conserves system resources, as numerous activity streams that do not include the objective activities need not be processed. A minor tradeoff is that some replays may not be detected in the first instance, i.e., replays of activity sequences that did not initially include an objective activity and that had an objective activity inserted for replay.

In these implementations, the exploitation detection system 140 can also select activities in the activity sequence that are within a window of ordinal positions of the ordinal position of the objective activity. For example, for an activity sequence of 50 actions that includes 1 objective activity, the objective activity, five activities preceding the objective activity in the sequence, and five activities subsequent to the objective activity may be selected for analysis.

The example implementations above have been described with respect to ordinal positions that may be further defined by time indices. In alternative implementations, the sequence can be defined by the time indices alone, that is, each activity in an activity sequence can be at respective times relative to other activities in the first activity sequence. Signatures can be generated using the relative times instead of the ordinal positions, and windowing can be done based on time windows instead of ordinal position windows.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   accessing, by a data processing apparatus, activity data describing:
      a first activity sequence for a first user session, the first activity sequence being a first sequence of activities that were observed during the first user session, each activity in the first activity sequence being at a respective ordinal position in the sequence;
      a plurality of second activity sequences, wherein each second activity sequence is for a respective second user session that is a different session from the first user session and being a second sequence of activities that were observed during the second user session, each activity in the second activity sequence being at a respective ordinal position in the sequence;
   generating, by the data processing apparatus, a first activity sequence signature from the first activity sequence;
   generating, by the data processing apparatus and for each second activity sequence, a respective second activity sequence signature from the second activity sequence;
   for each second activity sequence, determining, by the data processing apparatus and from the first activity sequence signature and the second activity sequence signature of the second activity sequence, a similarity measure that is a measure of similarity of the first activity sequence to the second activity sequence;
   for each second activity sequence having a similarity measure that meets a threshold, determining by the data processing apparatus that a security violation occurred durin the second user session of the second activity sequence; and
   for each second activity sequence having a similarity measure that does not meet the threshold, determining by the data processing apparatus that a security violation did not occur during the second user session of the second activity sequence;
   wherein generating each activity sequence signature comprises:
      generating, for the activity sequence, activity sequence subsequences, each subsequence being a proper subset of the activities in the activity sequence;
      generating, for each activity sequence subsequence, an activity sequence signature from the proper subset of activities in the activity sequence subsequence.

2. A method performed by data processing apparatus, the method comprising:
   accessing, by a data processing apparatus, activity data describing:
      a first activity sequence for a first user session, the first activity sequence being a first sequence of activities that were observed during the first user session, each activity in the first activity sequence being at a respective ordinal position in the sequence;
      a plurality of second activity sequences, wherein each second activity sequence is for a respective second user session that is a different session from the first user session and being a second sequence of activities that were observed during the second user session, each activity in the second activity sequence being at a respective ordinal position in the sequence;
   generating, by the data processing apparatus, a first activity sequence signature from the first activity sequence;
   generating, by the data processing apparatus and for each second activity sequence, a respective second activity sequence signature from the second activity sequence;
   for each second activity sequence, determining, by the data processing apparatus and from the first activity sequence signature and the second activity sequence signature of the second activity sequence, a similarity measure that is a measure of similarity of the first activity sequence to the second activity sequence;

for each second activity sequence having a similarity measure that meets a threshold, determining by the data processing apparatus that a security violation occurred durin the second user session of the second activity sequence; and for each second activity sequence having a similarity measure that does not meet the threshold, determining by the data processing apparatus that a security violation did not occur during the second user session of the second activity sequence;

wherein:

each second activity sequence is a sequence that includes an objective activity of the security violation, and includes a plurality of activities that are not objective activities of the security violation.

3. The method of claim 2, wherein generating each activity sequence signature comprises generating a hash of the activity sequence.

4. The method of claim 3, wherein generating a hash of the activity sequence comprises generating a hash of the activity sequence using a similarity hash algorithm.

5. The method of claim 2, wherein for each second activity sequence, generating the second activity signature comprises:

selecting activities in the second activity sequence that are within a window of ordinal positions of the ordinal position of the objective activity, wherein the cardinality of the ordinal positions of window of ordinal positions is less than the cardinality of ordinal positions in the second activity sequence;

generating the second activity signature from the selected activities of the second activity sequence.

6. The method of claim 2, further comprising:

for each second activity sequence for which a security violation is determined to have occurred, discounting the activity described by the objective activity.

7. The method of claim 6, wherein discounting the activity described by the objective activity comprises:

for each second activity sequence for which a security violation is determined to have occurred for a binary operation, inverting the result of the binary operation.

8. The method of claim 6, wherein discounting the activity described by the objective activity comprises:

for each second activity sequence for which a security violation is determined to have occurred for a binary operation, ignoring the result of the binary operation.

9. A method performed by data processing apparatus, the method comprising:

accessing, by a data processing apparatus, activity data describing:

a first activity sequence for a first user session, the first activity sequence being a first sequence of activities that were observed during the first user session, each activity in the first activity sequence being at a respective ordinal position in the sequence;

a plurality of second activity sequences, wherein each second activity sequence is for a respective second user session that is a different session from the first user session and being a second sequence of activities that were observed during the second user session, each activity in the second activity sequence being at a respective ordinal position in the sequence;

generating, by the data processing apparatus, a first activity sequence signature from the first activity sequence;

generating, by the data processing apparatus and for each second activity sequence, a respective second activity sequence signature from the second activity sequence;

for each second activity sequence, determining, by the data processing apparatus and from the first activity sequence signature and the second activity sequence signature of the second activity sequence, a similarity measure that is a measure of similarity of the first activity sequence to the second activity sequence;

for each second activity sequence having a similarity measure that meets a threshold, determining by the data processing apparatus that a security violation occurred durin the second user session of the second activity sequence; and for each second activity sequence having a similarity measure that does not meet the threshold, determining by the data processing apparatus that a security violation did not occur during the second user session of the second activity sequence;

wherein each of the first and second activity sequence includes, for each activity, a time value that describes a time that the activity occurred; and wherein generating each activity sequence signature comprises determining the activity sequence signature based on each activity, each ordinal position of the activity, and each time value of the activity.

10. A method performed by data processing apparatus, the method comprising:

accessing, by a data processing apparatus, activity data describing:

a first activity sequence for a first user session, the first activity sequence being a first sequence of activities that were observed during the first user session, each activity in the first activity sequence being at a respective time relative to other activities in the first activity sequence;

a plurality of second activity sequences, wherein each second activity sequence is for a respective second user session that is a different session from the first user session and being a second sequence of activities that were observed during the second user session, each activity in the second activity sequence being at a respective time in the second activity sequence relative to other activities in the second activity sequence;

generating, by the data processing apparatus, a first activity sequence signature from the first activity sequence;

generating, by the data processing apparatus, for each second activity sequence, a respective second activity sequence signature from the second activity sequence;

for each second activity sequence, determining, by the data processing apparatus and from the first activity sequence signature and the second activity sequence signature of the second activity sequence, a similarity measure that is a measure of similarity of the first activity sequence to the second activity sequence;

for each second activity sequence having a similarity measure that meets a threshold, determining by the data processing apparatus that a security violation occurred during the second user session of the second activity sequence; and for each second activity sequence having a similarity measure that does not meet the threshold, determining by the data processing apparatus that a security violation did not occur during the second user session of the second activity sequence;

wherein:
each second activity sequence is a sequence that includes an objective activity of the security violation, and includes a plurality of activities that are not objective activities of the security violation; and
for each second activity sequence, generating the second activity signature comprises:
selecting activities in the second activity sequence that are within a window of time of the objective activity; and
generating the second activity signature from the selected activities of the second activity sequence.

11. A non-transitory computer storage medium encoded with a computer program, the program comprising instructions that when executed by data processing apparatus cause the data processing apparatus to perform operations comprising:
accessing activity data describing:
a first activity sequence for a first user session, the first activity sequence being a first sequence of activities that were observed during the first user session, each activity in the first activity sequence being at a respective ordinal position in the sequence;
a plurality of second activity sequences, wherein each second activity sequence is for a respective second user session that is a different session from the first user session and being a second sequence of activities that were observed during the second user session, each activity in the second activity sequence being at a respective ordinal position in the sequence;
generating a first activity sequence signature from the first activity sequence;
generating, for each second activity sequence, a respective second activity sequence signature from the second activity sequence;
for each second activity sequence, determining from the first activity sequence signature and the second activity sequence signature of the second activity sequence, a similarity measure that is a measure of similarity of the first activity sequence to the second activity sequence;
for each second activity sequence having a similarity measure that meets a threshold, determining that a security violation occurred during the second user session of the second activity sequence; and
for each second activity sequence having a similarity measure that does not meet the threshold, determining that a security violation did not occur during the second user session of the second activity sequence;
wherein generating each activity sequence signature comprises:
generating, for the activity sequence, activity sequence subsequences, each subsequence being a proper subset of the activities in the activity sequence;
generating, for each activity sequence subsequence, an activity sequence signature from the proper subset of activities in the activity sequence subsequence.

12. A non-transitory computer storage medium encoded with a computer program, the program comprising instructions that when executed by data processing apparatus cause the data processing apparatus to perform operations comprising:
accessing activity data describing:
a first activity sequence for a first user session, the first activity sequence being a first sequence of activities that were observed during the first user session, each activity in the first activity sequence being at a respective ordinal position in the sequence;
a plurality of second activity sequences, wherein each second activity sequence is for a respective second user session that is a different session from the first user session and being a second sequence of activities that were observed during the second user session, each activity in the second activity sequence being at a respective ordinal position in the sequence;
generating a first activity sequence signature from the first activity sequence;
generating, for each second activity sequence, a respective second activity sequence signature from the second activity sequence;
for each second activity sequence, determining from the first activity sequence signature and the second activity sequence signature of the second activity sequence, a similarity measure that is a measure of similarity of the first activity sequence to the second activity sequence;
for each second activity sequence having a similarity measure that meets a threshold, determining that a security violation occurred during the second user session of the second activity sequence; and
for each second activity sequence having a similarity measure that does not meet the threshold, determining that a security violation did not occur during the second user session of the second activity sequence;
wherein:
each second activity sequence is a sequence that includes an objective activity of the security violation, and includes a plurality of activities that are not objective activities of the security violation.

13. The non-transitory computer storage medium of claim 12, wherein generating each activity sequence signature comprises generating a hash of the activity sequence.

14. The non-transitory computer storage medium of claim 13, wherein generating a hash of the activity sequence comprises generating a hash of the activity sequence using a similarity hash algorithm.

15. The non-transitory computer storage medium of claim 12, wherein for each second activity sequence, generating the second activity signature comprises:
selecting activities in the second activity sequence that are within a window of ordinal positions of the ordinal position of the objective activity, wherein the cardinality of the ordinal positions of window of ordinal positions is less than the cardinality of ordinal positions in the second activity sequence;
generating the second activity signature from the selected activities of the second activity sequence.

16. The non-transitory computer storage medium of claim 12, the operation further comprising:
for each second activity sequence for which a security violation is determined to have occurred, discounting the activity described by the objective activity.

17. A non-transitory computer storage medium encoded with a computer program, the program comprising instructions that when executed by data processing apparatus cause the data processing apparatus to perform operations comprising:
accessing activity data describing:
a first activity sequence for a first user session, the first activity sequence being a first sequence of activities that were observed during the first user session, each activity in the first activity sequence being at a respective ordinal position in the sequence;
a plurality of second activity sequences, wherein each second activity sequence is for a respective second user session that is a different session from the first user session and being a second sequence of activities that were observed during the second user session, each activity in the second activity sequence being at a respective ordinal position in the sequence;

generating a first activity sequence signature from the first activity sequence;

generating, for each second activity sequence, a respective second activity sequence signature from the second activity sequence;

for each second activity sequence, determining from the first activity sequence signature and the second activity sequence signature of the second activity sequence, a similarity measure that is a measure of similarity of the first activity sequence to the second activity sequence;

for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence;

wherein each of the first and second activity sequence includes, for each activity, a time value that describes a time that the activity occurred; and wherein generating each activity sequence signature comprises determining the activity sequence signature based on each activity, each ordinal position of the activity, and each time value of the activity.

18. A non-transitory computer storage medium encoded with a computer program, the program comprising instructions that when executed by data processing apparatus cause the data processing apparatus to perform operations comprising: accessing activity data describing: a first activity sequence for a first user session, the first activity sequence being a first sequence of activities that were observed during the first user session, each activity in the first activity sequence being at a respective time relative to other activities in the first activity sequence; a plurality of second activity sequences, wherein each second activity sequence is for a respective second user session that is a different session from the first user session and being a second sequence of activities that were observed during the second user session, each activity in the second activity sequence being at a respective time in the second activity sequence relative to other activities in the second activity sequence; generating a first activity sequence signature from the first activity sequence; generating, for each second activity sequence, a respective second activity sequence signature from the second activity sequence; for each second activity sequence, determining, from the first activity sequence signature and the second activity sequence signature of the second activity sequence, a similarity measure that is a measure of similarity of the first activity sequence to the second activity sequence; for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence; wherein: each second activity sequence is a sequence that includes an objective activity of the security violation, and includes a plurality of activities that are not objective activities of the security violation; and for each second activity sequence, generating the second activity signature comprises: selecting activities in the second activity sequence that are within a window of time of the objective activity; and generating the second activity signature from the selected activities of the second activity sequence.

19. A system, comprising:

a data processing apparatus; and a computer storage medium encoded with a computer program and in data communication with the data processing apparatus, the program comprising instructions that when executed by the data processing apparatus cause the data processing apparatus to perform operations comprising:

accessing activity data describing:

a first activity sequence for a first user session, the first activity sequence being a first sequence of activities that were observed during the first user session, each activity in the first activity sequence being at a respective ordinal position in the sequence;

a plurality of second activity sequences, wherein each second activity sequence is for a respective second user session that is a different session from the first user session and being a second sequence of activities that were observed during the second user session, each activity in the second activity sequence being at a respective ordinal position in the sequence;

generating a first activity sequence signature from the first activity sequence;

generating, for each second activity sequence, a respective second activity sequence signature from the second activity sequence;

for each second activity sequence, determining from the first activity sequence signature and the second activity sequence signature of the second activity sequence, a similarity measure that is a measure of similarity of the first activity sequence to the second activity sequence;

for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence;

wherein:

each second activity sequence is a sequence that includes an objective activity of the security violation, and includes a plurality of activities that are not objective activities of the security violation.

20. A system, comprising:

a data processing apparatus; and a computer storage medium encoded with a computer program and in data communication with the data processing apparatus, the program comprising instructions that when executed by the data processing apparatus cause the data processing apparatus to perform operations comprising:

accessing activity data describing:

a first activity sequence for a first user session, the first activity sequence being a first sequence of activities that were observed during the first user session, each activity in the first activity sequence being at a respective time relative to other activities in the first activity sequence;

a plurality of second activity sequences, wherein each second activity sequence is for a respective second user session that is a different session from the first user session and being a second sequence of activities that were observed during the second user session, each activity in the second activity sequence being at a respective time in the second activity sequence relative to other activities in the second activity sequence;

generating a first activity sequence signature from the first activity sequence;

generating, for each second activity sequence, a respective second activity sequence signature from the second activity sequence;

for each second activity sequence, determining, from the first activity sequence signature and the second activity sequence signature of the second activity sequence, a similarity measure that is a measure of similarity of the first activity sequence to the second activity sequence;

for each second activity sequence having a similarity measure that meets a threshold, determining that a security violation occurred during the second user session of the second activity sequence; and for each second activity sequence having a similarity measure that does not meet the threshold, determining that a security violation did not occur during the second user session of the second activity sequence;

wherein:
each second activity sequence is a sequence that includes an objective activity of the security violation, and includes a plurality of activities that are not objective activities of the security violation; and for each second activity sequence, generating the second activity signature comprises:
selecting activities in the second activity sequence that are within a window of time of the objective activity; and
generating the second activity signature from the selected activities of the second activity sequence.

21. A method performed by data processing apparatus, the method comprising:
accessing, by a data processing apparatus, activity data describing:
a first activity sequence for a first user session, the first activity sequence being a first sequence of activities that were observed during the first user session, each activity in the first activity sequence being a user action performed at the user device;
a plurality of second activity sequences, wherein each second activity sequence is for a respective second user session that is a different session from the first user session and being a second sequence of activities that were observed during the second user session, each activity in the second activity sequences being a user action performed at a user device;
generating, by the data processing apparatus, a first activity sequence signature from the first activity sequence;
generating, by the data processing apparatus and for each second activity sequence, a respective second activity sequence signature from the second activity sequence;
for each second activity sequence, determining, by the data processing apparatus and from the first activity sequence signature and the second activity sequence signature, a similarity measure that is a measure of similarity of the first activity sequence to the second activity sequence;
for each second activity sequence having a similarity measure that meets a threshold, determining by the data processing apparatus that a security violation occurred during the second user session of the second activity sequence; and
for each second activity sequence having a similarity measure that does not meet the threshold, determining by the data processing apparatus that a security violation did not occur during the second user session of the second activity sequence.

22. The method of claim 21, wherein generating each activity sequence signature comprises:
generating, for the activity sequence, activity sequence subsequences, each subsequence being a proper subset of the activities in the activity sequence;
generating, for each activity sequence subsequence, an activity sequence signature from the proper subset of activities in the activity sequence subsequence.

23. The method of claim 21, wherein each second activity sequence is a sequence that includes an objective activity of the security violation, and includes a plurality of activities that are not objective activities of the security violation.

24. The method of claim 21, further comprising:
for each second activity sequence for which a security violation is determined to have occurred, discounting the activity described by the objective activity.

25. The method of claim 24, wherein discounting the activity described by the objective activity comprises:
for each second activity sequence for which a security violation is determined to have occurred for a binary operation, inverting the result of the binary operation.

26. The method of claim 24, wherein discounting the activity described by the objective activity comprises:
for each second activity sequence for which a security violation is determined to have occurred for a binary operation, ignoring the result of the binary operation.

27. A system, comprising:
a data processing apparatus; and
a computer storage medium encoded with a computer program and in data communication with the data processing apparatus, the program comprising instructions that when executed by the data processing apparatus cause the data processing apparatus to perform operations comprising:
accessing activity data describing:
a first activity sequence for a first user session, the first activity sequence being a first sequence of activities that were observed during the first user session, each activity in the first activity sequence being a user action performed at the user device;
a plurality of second activity sequences, wherein each second activity sequence is for a respective second user session that is a different session from the first user session and being a second sequence of activities that were observed during the second user session, each activity in the second activity sequences being a user action performed at a user device;
generating a first activity sequence signature from the first activity sequence;
generating, for each second activity sequence, a respective second activity sequence signature from the second activity sequence;
for each second activity sequence, determining, from the first activity sequence signature and the second activity sequence signature, a similarity measure that is a measure of similarity of the first activity sequence to the second activity sequence;
for each second activity sequence having a similarity measure that meets a threshold, determining that a security violation occurred during the second user session of the second activity sequence; and
for each second activity sequence having a similarity measure that does not meet the threshold, determining that a security violation did not occur during the second user session of the second activity sequence.

28. The system of claim 27, wherein generating each activity sequence signature comprises:
   generating, for the activity sequence, activity sequence subsequences, each subsequence being a proper subset of the activities in the activity sequence;
   generating, for each activity sequence subsequence, an activity sequence signature from the proper subset of activities in the activity sequence subsequence.

29. The system of claim 27, wherein each second activity sequence is a sequence that includes an objective activity of the security violation, and includes a plurality of activities that are not objective activities of the security violation.

30. The system of claim 27, the operations further comprising:
   for each second activity sequence for which a security violation is determined to have occurred, discounting the activity described by the objective activity.

31. The system of claim 30, wherein discounting the activity described by the objective activity comprises:
   for each second activity sequence for which a security violation is determined to have occurred for a binary operation, inverting the result of the binary operation.

32. The system of claim 30, wherein discounting the activity described by the objective activity comprises:
   for each second activity sequence for which a security violation is determined to have occurred for a binary operation, ignoring the result of the binary operation.

33. A method performed by data processing apparatus, the method comprising:
   accessing, by a data processing apparatus, activity data describing:
      a first activity sequence describing a sequence of user actions performed at a user device;
      a plurality of second activity sequences, wherein each second activity sequence describes a sequence of user actions performed at a respective user device and is different from the first activity sequence;
   generating, by the data processing apparatus, a first activity sequence signature from the first activity sequence;
   generating, by the data processing apparatus and for each second activity sequence, a respective second activity sequence signature from the second activity sequence;
   for each second activity sequence, determining, by the data processing apparatus and from the first activity sequence signature and the second activity sequence signature, a similarity measure that is a measure of similarity of the first activity sequence to the second activity sequence;
   for each second activity sequence having a similarity measure that meets a threshold, determining by the data processing apparatus that a security violation occurred during the performance of the second activity sequence; and
   for each second activity sequence having a similarity measure that does not meet the threshold, determining by the data processing apparatus that a security violation did not occur during the performance of the second activity sequence.

34. A method performed by data processing apparatus, the method comprising:
   determining that a security violation occurred during the performance of an activity sequence, wherein the activity sequence describes a sequence of user actions performed at a respective user device, the determination based on a similarity of the activity sequence to another activity sequence;
   identifying a user action that is an objective activity of the security violation; and
   discounting the activity described by the objective activity.

35. The method of claim 34, wherein discounting the activity described by the objective activity comprises, for the objective activity being a binary operation, ignoring the result of the binary operation.

* * * * *